United States Patent Office 3,157,623
Patented Nov. 17, 1964

3,157,623
COPOLYMERS OF A VINYL SUBSTITUTED
ETHYLENE GLYCOL
Robert Arnold Braun, North Star, Newark, Del., assignor to E. I. du Pont de Nemours and Company, Wilmington, Del., a corporation of Delaware
No Drawing. Filed Feb. 13, 1961, Ser. No. 88,605
7 Claims. (Cl. 260—80.5)

This invention relates to copolymers of a vinyl substituted ethylene glycol and at least one other unsaturated monomer copolymerizable therewith.

It is an object of this invention to provide new and novel copolymers having improved properties with respect to insolubility in organic liquids, electrical insulation, resistant to degradation upon exposure to relatively high temperatures over prolonged periods and improved adhesion to a variety of substrates.

The objectives of this invention are accomplished by reacting 0.1 to 25.0 parts of a vinyl substituted ethylene glycol with 99.9 to 75.0 parts of at least one other ethylenically unsaturated monomer copolymerizable therewith.

The vinyl substituted ethylene glycol is represented by the following empirical formula:

$$\begin{array}{c} \text{OH} \quad \text{OH} \\ | \quad\quad | \\ \text{R}'-\text{C}-\!\!-\!\!-\text{C}-\text{CH}=\text{CH}_2 \\ | \quad\quad | \\ \text{R} \quad\quad \text{R} \end{array}$$

In the above formula R can be hydrogen, alkyl (1–10C), aryl or substituted aryl, and R' can be hydrogen, alkyl (1–10C), aryl, substituted aryl, alkenyl or vinyl radical.

The following are examples of vinyl substituted ethylene glycols falling within the above formula which are useful for forming copolymers with other ethylenically unsaturated monomers in accordance with this invention:

$$\begin{array}{c} \text{OH} \quad \text{OH} \\ | \quad\quad | \\ \text{CH}_2-\text{CH}-\text{CH}=\text{CH}_2 \end{array}$$
Vinyl ethylene glycol $$\begin{array}{c} \text{OH} \quad \text{OH} \\ | \quad\quad | \\ \text{CH}_2=\text{CH}-\text{CH}-\text{CH}-\text{CH}=\text{CH}_2 \end{array}$$
Divinyl ethylene glycol $$\begin{array}{c} \text{OH} \quad \text{OH} \\ | \quad\quad | \\ \text{CH}_3-\text{CH}=\text{CH}-\text{CH}-\text{CH}-\text{CH}=\text{CH}_2 \end{array}$$
1-vinyl-2-propenyl-ethylene glycol $$\begin{array}{c} \text{CH}_3 \quad \text{OH} \quad \text{OH} \\ | \quad\quad | \quad\quad | \\ \text{CH}_2=\text{C}-\!\!-\!\!-\text{CH}-\text{CH}-\text{CH}=\text{CH}_2 \end{array}$$
1-vinyl-2-isopropenyl ethylene glycol $$\begin{array}{c} \text{OH} \quad \text{OH} \\ | \quad\quad | \\ \text{C}_6\text{H}_5-\text{CH}=\text{CH}-\text{CH}-\text{CH}-\text{CH}=\text{CH}_2 \end{array}$$
1-vinyl-2-beta styryl ethylene glycol $$\begin{array}{c} \text{OH} \quad \text{OH} \\ | \quad\quad | \\ \text{CH}_2=\text{CH}-\text{C}-\!\!-\!\!-\text{C}-\text{CH}=\text{CH}_2 \\ | \quad\quad | \\ \text{CH}_3 \quad \text{CH}_3 \end{array}$$
2,3-divinyl-butane-2,3-diol $$\begin{array}{c} \text{OH} \quad \text{OH} \\ | \quad\quad | \\ \text{CH}_3-\text{CH}=\text{CH}-\text{C}-\!\!-\!\!-\text{C}-\text{CH}=\text{CH}_2 \\ | \quad\quad | \\ \text{CH}_3 \quad \text{CH}_3 \end{array}$$
2-vinyl-3-propenyl-butane-2,3-diol $$\begin{array}{c} \text{OH} \quad \text{OH} \\ | \quad\quad | \\ \text{C}_2\text{H}_5-\text{CH}-\text{CH}-\text{CH}=\text{CH}_2 \end{array}$$
1-ethyl-2-vinyl-ethylene glycol $$\begin{array}{c} \text{OH} \quad \text{OH} \\ | \quad\quad | \\ \text{C}_6\text{H}_5-\text{CH}-\text{CH}-\text{CH}=\text{CH}_2 \end{array}$$
1-phenyl-2-vinyl-ethylene glycol $$\begin{array}{c} \text{OH} \quad \text{OH} \\ | \quad\quad | \\ \text{CH}_2=\text{CH}-\text{CH}_2-\text{CH}-\text{CH}-\text{CH}=\text{CH}_2 \end{array}$$
Hepta-1,6-diene-3,4-diol $$\begin{array}{c} \text{OH} \quad \text{OH} \\ | \quad\quad | \\ \text{C}_6\text{H}_5-\text{CH}=\text{CH}-\text{C}-\!\!-\!\!-\text{C}-\text{CH}=\text{CH}_2 \\ | \quad\quad | \\ \text{C}_6\text{H}_5 \quad \text{C}_6\text{H}_5 \end{array}$$
1,2-diphenyl-1-cinnamyl-2-vinyl ethylene glycol The vinyl substituted ethylene glycols are copolymerized with at least one other ethylenically unsaturated monomer, such as, those which are known to be copolymerizable with acrylonitrile including acrylonitrile itself, acrylic and methacrylic acids, acrylate and methacrylate esters, methacrylonitrile, acrylamide, methoxy ethyl acrylate, vinyl acetate, styrene, ethylene, propylene, butylene, alpha methyl styrene, vinyl chloride and vinylidene chloride.

It is within the scope of this invention to copolymerize one or more of the vinyl substituted ethylene glycols with one or more of the ethylenically unsaturated monomers in the foregoing list or their equivalents. The copolymerization takes place through the vinyl group on the glycol, which leaves the OH groups available in the resulting copolymers for further reaction, such as bonding to substrates.

The particularly preferred copolymers of this invention are the terpolymers which are derived from the copolymerization of a vinyl substituted ethylene glycol, an ester of an alpha olefinic monocarboxylic acid containing a methylene group attached to the alpha carbon atom, and a nitrile of the aforementioned acids. Specific examples of the acid include acrylic acid and methacrylic acid and the esters include methyl, ethyl, propyl, butyl, pentyl, hexyl, heptyl, octyl, 2-ethyl hexyl, nonyl and decyl esters of methacrylic or acrylic acid.

Throughout the specification and claims, the parts and percentage figures are expressed on a weight basis unless stated otherwise.

*Example I*

To a reaction vessel equipped with a stirrer, condenser, thermometer and nitrogen inlet were added 200 parts of distilled water and 1 part of sodium lauryl sulfate. After heating the water to 65° C. a mixture of 35 parts of freshly distilled acrylonitrile, 60 parts of n-butyl acrylate and 5 parts of divinyl ethylene glycol (1,5-hexadiene-3,4-diol) were added to the reaction vessel. The charge was heated to 60° C. after which 0.5 part of ammonium persulfate, dissolved in 10 parts of water, were added to the charge followed by the addition of a solution containing 0.1 part of sodium bisulfite dissolved in 2 parts of water. The reaction mixture was stirred for two hours at 55–65° C. and then the temperature was increased to 80° C. and held at this temperature for fifteen minutes. The resulting aqueous dispersion of the polymer had a solids content of 27% as compared to the theoretical solids of 33%.

The polymer dispersion was cast on a polytetrafluoroethylene resin coated steel panel and air-dried to give a tough self supporting film 1 mil thick which was insoluble in dimethyl formamide. A copolymer similarly prepared, except the divinyl ethylene glycol was omitted, was completely soluble in dimethyl formamide.

After four weeks exposure at 170° C., copper panels coated directly on each side with the terpolymer dispersion to deposit a film about 1 mil thick on drying showed no degradation, no blistering or loss of adhesion upon bending the coated panel over a ¼ inch mandrel. After four weeks at 170° C. controls of copper panels similarly coated with a similarly prepared copolymer, except the divinyl ethylene glycol was omitted, exhibited considerable blistering and delaminated upon bending the coated panel over a ¼ inch mandrel.

The aqueous dispersion of the polymer was found to be useful as an adhesive for adhering preformed film of polyvinyl fluoride to itself, aluminum, phosphate or chromate treated aluminum, and wood. In making laminates, the aqueous dispersion is applied to one or both of the surfaces to be adhered and the water allowed to evaporate, after which the assembly is subjected to heat and pressure at about 100–175° C. and 500–200° p.s.i. for about ½ to 10 minutes.

The terpolymer dispersion is also useful as an electrical insulation coating for magnet wire and also for coating fabric to make electrical insulation products, such as slot liners and cable wraps.

Other useful terpolymers derived from the same or equivalent monomers in the foregoing example can be prepared from the following monomeric polymerizable components, the composition of which varies within the ranges indicated below:

|  | Parts by weight |
|---|---|
| (1) A nitrile of an alpha olefenic monocarboxylic acid having a methylene group attached to the alpha carbon atom | 30–80 |
| (2) An ester of an alpha olefinic monocarboxylic acid having a methylene group attached to the alpha carbon atom | 15–65 |
| (3) A vinyl substituted ethylene glycol for a total of 100 parts of the polymerizable components | 0.1–25 |

*Example II*

A terpolymer was prepared in the same manner as described in Example I except 60 parts of acrylonitrile, 35 parts of n-butyl methacrylate and 5 parts of divinyl ethylene glycol were employed instead of the proportions mentioned in Example I. Also the polymerization initiator was a mixture of 2 parts of alpha, alpha azoisobutyramidine hydrochloride and 1.6 part of disodium hydrogen phosphate in place of the ammonium persulfate and sodium bisulfite.

The terpolymer dispersion was useful for the coating of magnet wire where cut-through resistance is more important than flexibility.

*Example III*

An aqueous dispersion was prepared in the same manner as described in Example I, except the following monomers and proportions were employed; vinylidene chloride 93.5 parts, methyl acrylate 6.0 parts and divinyl ethylene glycol 0.5 part, all other materials and conditions being the same. The resulting aqueous dispersion was useful as a coating composition for cellophane to render it moisture impermeable.

*Example IV*

A terpolymer derived from 16 parts ethyl acrylate, 83.0 parts of ethylene and 1.0 part divinyl ethylene glycol were continuously reacted at about 190° C. under a pressure of about 1400 atmospheres in benzene for about 15 minutes residence time, in the presence of about 0.01 part of tertiary butyl peracetate and about 50 parts of benzene. About 13.0% of the monomer mixture was converted to polymer. The unreacted monomers and solvent were separated from the polymer at reduced pressure and elevated temperature.

The resulting polymer was useful as a hot melt adhesive for adhering aluminum foil, paper, polyethylene terephthalate, polyvinyl fluoride, to themselves, to each other or other surfaces.

*Example V*

A mixture of 95 parts of methyl methacrylate and 5 parts divinyl ethylene glycol, .1 part azoisobutyronitrile and 100 parts of toluene were heated at reflux (80° C.) for 16 hours at atmospheric pressure.

An 89% yield of polymer was obtained, i.e. 89% the monomer was converted to polymer.

Product was 44.6% polymer in toluene.

The polymer solution was cast on an aluminum panel to deposit a film about 1 mil thick, when dried, and a film of polyvinyl fluoride was superimposed over the cast film and the assembly laminated in the manner described in Example I to produce a firmly bonded structure.

*Example VI*

A rubbery copolymer useful as an adhesive is prepared in the manner described in Example I, except 7 parts of vinyl ethylene glycol and 93 parts of n-hexyl acrylate, were substituted for the copolymer forming reactants.

*Example VII*

A copolymer useful as a flexible adhesive for bonding paper, metal foil and plastic film to other substrates or to themselves is prepared in the same manner as described in Example I, except the 95 parts of ethylene and 5 parts of divinyl ethylene glycol were substituted for the copolymer reactants.

*Example VIII*

A copolymer useful as a surface coating for rigid substrates is prepared in the same manner as described in Example I, except 9 parts 2,3-divinyl butane-2,3-diol and 91 parts of styrene were substituted for the copolymer reactants.

I claim:

1. A copolymer of about 0.1–25 parts by weight of a compound of the following empirical formula:

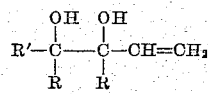

and 99.9–75 parts by weight of at least one other ethylenically unsaturated monomer copolymerizable therewith, wherein R is a member of the class consisting of hydrogen, $C_1$–$C_{10}$ alkyl and aryl radicals, and R' is an alkenyl radical, said other ethylenically unsaturated monomer(s) being from the class consisting of acrylonitrile, methacrylonitrile, acrylamide, acrylic acid, methacrylic acid, acrylic ester of $C_1$–$C_{10}$ alkanol, methacrylic ester of $C_1$–$C_{10}$ alkanol, methoxy ethyl acrylate, vinyl acetate, vinyl chloride, vinylidene chloride, ethylene, propylene, butylene, styrene and alpha-methyl styrene.

2. The product of claim 1 in which the glycol is divinyl ethylene glycol.

3. An interpolymer of (1) a divinyl substituted ethylene glycol, (2) a $C_1$–$C_{10}$ alkanol ester of an alpha olefinic monocarboxylic acid containing a methylene group attached to the alpha carbon atom, and (3) a nitrile of said acid.

4. An interpolymer consisting essentially of:

|  | Parts by weight |
|---|---|
| (1) a nitrile of an alpha olefinic monocarboxylic acid having a methylene group attached to the alpha carbon atoms | 30–80 |
| (2) a $C_1$–$C_{10}$ alkanol ester of alpha olefinic monocarboxylic acid having a methylene group attached to the alpha carbon atoms | 15–65 |
| (3) a divinyl substituted ethylene glycol for a total of 100 parts by weight | 0.5–25 |

5. An interpolymer of claim 4 in which the nitrile is acrylonitrile.

6. An interpolymer of monomers consisting essentially of about 35 parts by weight of acrylonitrile, 60 parts by weight of butyl acrylate and 5 parts by weight of divinyl ethylene glycol.

7. The copolymer of claim 1 in which R' is a vinyl radical.

References Cited in the file of this patent

UNITED STATES PATENTS

| | | |
|---|---|---|
| 2,818,362 | Drechsel | Dec. 31, 1957 |
| 2,954,366 | Pellon | Sept. 27, 1960 |